(12) United States Patent
Saudray et al.

(10) Patent No.: US 8,795,610 B2
(45) Date of Patent: Aug. 5, 2014

(54) PROCESS FOR REPROCESSING SPENT NUCLEAR FUEL NOT REQUIRING A PLUTONIUM-REDUCING STRIPPING OPERATION

(75) Inventors: Didier Saudray, Orange (FR); Binh Dinh, Pont Saint Esprit (FR); Pascal Baron, Bagnols sur Ceze (FR); Michel Masson, Avignon (FR); Christian Sorel, Villeneuve-les-Avignon (FR); Manuel Miguirditchian, Avignon (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 120 days.

(21) Appl. No.: 13/699,748

(22) PCT Filed: May 25, 2011

(86) PCT No.: PCT/EP2011/058562
§ 371 (c)(1),
(2), (4) Date: Apr. 18, 2013

(87) PCT Pub. No.: WO2011/147871
PCT Pub. Date: Dec. 1, 2011

(65) Prior Publication Data
US 2013/0202501 A1    Aug. 8, 2013

(30) Foreign Application Priority Data
May 27, 2010  (FR) .................................... 10 54087

(51) Int. Cl.
*C22B 60/00*  (2006.01)
*C22B 3/06*  (2006.01)
*G21C 19/46*  (2006.01)
*C22B 7/00*  (2006.01)
*C22B 60/04*  (2006.01)

(52) U.S. Cl.
CPC ................. *C22B 60/04* (2013.01); *C22B 3/065* (2013.01); *G21C 19/46* (2013.01); *C22B 7/007* (2013.01)
USPC ...................................... 423/8; 423/9; 423/10

(58) Field of Classification Search
None
See application file for complete search history.

(56) References Cited

U.S. PATENT DOCUMENTS

| 4,772,429 A | 9/1988 | Descouls et al. |
| 5,132,092 A | 7/1992 | Musikas et al. |
| 2006/0147359 A1 | 7/2006 | Dinh et al. |
| 2007/0290178 A1* | 12/2007 | Baron et al. ................. 252/643 |
| 2009/0184298 A1* | 7/2009 | Baron et al. ................. 252/638 |

FOREIGN PATENT DOCUMENTS

| EP | 0381579 A1 | 8/1990 |
| FR | 2591213 A1 | 6/1987 |
| FR | 2642561 A1 | 8/1990 |
| FR | 2862804 A1 | 5/2005 |
| WO | 2005052950 A2 | 6/2005 |
| WO | 2007135178 A1 | 11/2007 |
| WO | 2011/000844 | * 1/2011 |

* cited by examiner

*Primary Examiner* — Steven Bos
(74) *Attorney, Agent, or Firm* — Hultquist, PLLC; Mary B. Grant

(57) ABSTRACT

The invention relates to a process for reprocessing spent nuclear fuel which, among other advantages, does not require a plutonium-reducing stripping operation.
This process finds particular application in the processing of uranium oxide fuels and uranium and plutonium mixed oxide fuels.

27 Claims, 4 Drawing Sheets

PROCESS FOR REPROCESSING SPENT NUCLEAR FUEL NOT REQUIRING A PLUTONIUM-REDUCING STRIPPING OPERATION

CROSS-REFERENCE TO RELATED APPLICATIONS

This application is a U.S. national phase under the provisions of 35 U.S.C. §371 of International Patent Application No. PCT/EP11/58562 filed May 25, 2011, which in turn claims priority of French Patent Application No. 1054087 filed May 27, 2010. The disclosures of such international patent application and French priority patent application are hereby incorporated herein by reference in their respective entireties, for all purposes.

TECHNICAL FIELD

The present invention relates to a process for reprocessing spent nuclear fuel which, among other advantages, does not require a plutonium-reducing stripping operation.

This process finds particular application in the reprocessing of uranium oxide fuels and uranium and plutonium mixed oxide fuels.

STATE OF THE PRIOR ART

Plants for reprocessing spent nuclear fuel currently use the PUREX process (from Plutonium Uranium Refining by EXtraction) to recover the uranium and plutonium present in these fuels.

This is obtained by implementing several purification cycles by liquid-liquid extraction. The extractant used is tri-n-butyl phosphate which has particular affinity for uranium and plutonium.

The PUREX process, such as implemented at the reprocessing plants (UP2-800, UP3) in La Hague in France, schematically comprises three cycles, namely:
- a first cycle intended to decontaminate the uranium and plutonium jointly from the fission products and minor actinides, i.e. americium, curium and neptunium, to partition the uranium and plutonium into two aqueous flows; and
- two complementary cycles respectively called « second uranium cycle » and « second plutonium cycle » for the separate purification of the uranium and plutonium after their partitioning.

Recently, a major development of the PUREX process, called the COEX™ process (from COEXtraction) was proposed in the international PCT application published under number WO 2007/135178 (reference [1]).

Whilst ensuring comparable recovery and purification of the uranium and plutonium as in the PUREX process, this development allows a considerable reduction in the risks of plutonium being diverted for military uses.

It also allows a stream to be produced containing a mixture of purified plutonium, uranium and optionally neptunium, i.e. fully decontaminated from fission products, and the use of this stream to feed a so-called « co-conversion » unit whose function is to prepare a mixed oxide $(U,Pu)O_2$ or $(U,Pu,Np)O_2$ which can be directly used for the manufacture of nuclear fuels of MOX type (from Mixed OXide Fuel).

For this purpose, after decontamination operations of uranium and plutonium similar to those implemented during the first cycle of the PUREX process, the COEX™ process provides for the partitioning of the uranium and plutonium so as to obtain a first aqueous stream which contains plutonium, uranium and optionally neptunium, and a second aqueous stream which contains uranium and optionally neptunium but which does not contain any plutonium.

It also makes provision, in all the operations located downstream of this partitioning, to maintain the plutonium in the presence of uranium and optionally neptunium up until a mixed oxide is obtained $(U,Pu)O_2$ or $(U,Pu,Np)O_2$.

Therefore, in the COEX™ process, the « second plutonium cycle » of the PUREX process is replaced by a cycle intended to purify no longer the plutonium alone but the mixture of plutonium, uranium and optionally neptunium which is present in the first aqueous stream stemming from the partitioning.

In the PUREX and COEX™ processes, the partitioning of the uranium and plutonium into two aqueous phases is based on a stripping operation of the plutonium which is said to be « reductive » since it consists of stripping the plutonium from the organic phase in which it is contained by reducing it fully to oxidation state III, a state in which it is scarcely extractable by tri-n-butyl phosphate, and it therefore easily passes into an aqueous phase.

For this purpose, the organic phase containing the plutonium(IV) is contacted with a nitric aqueous phase which contains a reducing agent capable of reducing this plutonium(IV) to plutonium(III), jointly with an anti-nitrous agent to destroy the nitrous acid which tends to form in the aqueous phase, thereby stabilising both the reducing agent and the plutonium(III).

A plutonium-reducing stripping operation is also performed during the step intended to purify the plutonium in the PUREX process, and the mixture of plutonium, uranium and optionally neptunium in the COEX™ process.

These plutonium-reducing stripping operations, which combine a reducing reaction with liquid-liquid extraction, are relatively complex due to the occurrence of redox reactions. They effectively require the adding of reducing and anti-nitrous agents in amounts which may be very substantial for the reprocessing of MOX fuels having high plutonium content, which imposes operational constraints to guarantee the stability and safety of these operations, particularly having regard to some reaction products.

In addition, they need to be followed by operations which consist of re-oxidizing the plutonium(III) to plutonium(IV) either so that it can again be extracted in an organic phase or so that it can optionally be stored in aqueous phase since plutonium is only stable in an aqueous medium when in the oxidation state IV, which complicates the process.

Therefore, with the prospect of new plants being developed for the reprocessing of spent nuclear fuel, the Inventors have set themselves the objective of providing a process which, whilst giving the same performance as the PUREX and COEX™ processes in terms of recovery and decontamination of uranium and plutonium, does not require any plutonium-reducing stripping operation, in particular to achieve the partitioning of uranium and plutonium.

They also set themselves the objective that with this process it would be possible:
- either to produce, as in the COEX™ process, two streams one containing a mixture of purified plutonium, uranium and optionally neptunium, and the other purified uranium,
- or to produce, as in the PUREX process, two streams one containing purified plutonium and the other purified uranium, or to produce two streams one containing a mixture of purified plutonium and neptunium and the other purified uranium.

They also set themselves the objective that if this process is used to produce a stream containing a mixture of purified plutonium, uranium and optionally neptunium, it is able to offer much flexibility when adjusting the ratio between the quantities of plutonium and uranium present in the stream that is produced.

They further set themselves the objective that this process uses, at least in part, the knowledge and know-how acquired for the PUREX process, so that its use on industrial level is made possible in the short or medium term.

DESCRIPTION OF THE INVENTION

These objectives and others are achieved with the invention which proposes a process for reprocessing spent nuclear fuel comprising at least the following steps:

a) decontaminating the uranium and plutonium present in a nitric aqueous phase resulting from the dissolution of this fuel in nitric acid, to remove the americium, curium and most of the fission products also contained in this phase, which decontaminating comprises at least co-extracting the uranium, in oxidation state VI and the plutonium, in oxidation state IV, in an organic phase non-miscible with water and containing a first extractant which is more capable of extracting uranium (VI) and plutonium(IV) than actinides(III) and fission products from an acid aqueous phase;

b) co-stripping, in a nitric aqueous phase, the uranium and plutonium co-extracted at step a), the uranium being stripped in oxidation state IV and the plutonium being stripped in oxidation states IV and VI further to the formation, during this co-stripping, of plutonium(VI) by dismutation of the plutonium(IV);

c) partitioning the uranium and plutonium present in the nitric aqueous phase stemming from step b) into a first aqueous phase containing either plutonium without uranium or a mixture of uranium and plutonium, and a second aqueous phase containing uranium without plutonium, which partitioning at least comprises:

selectively extracting all or part of the uranium in oxidation state VI, in an organic phase non-miscible with water and containing a second extractant which is different from the first extractant and which is more capable of extracting uranium(VI) than plutonium(IV) from an acid aqueous phase, this extracting being performed after and/or jointly with treating of the nitric aqueous phase stemming from step b) to reduce the plutonium (VI) present in this phase to plutonium(IV); and stripping, in a nitric aqueous phase, the uranium(VI) thus extracted; and d) purifying the plutonium or the mixture of uranium and plutonium present in the aqueous phase stemming from the extraction of step c) to remove any fission products which may still be present in this phase.

Therefore, in the process of the invention, the partitioning of uranium and plutonium into two aqueous phases is based not on a stripping operation to reduce the plutonium contained in the organic phase stemming from the decontamination step, but on a selective extraction of all or part of the uranium contained in a nitric aqueous phase which comprises the uranium and plutonium that were co-extracted at the decontamination step.

This is made possible through:

firstly implementing, between the decontamination and partitioning steps, a step, namely step b), which consists of jointly stripping, in a nitric aqueous phase, the uranium and plutonium present in the organic phase stemming from the decontamination step, but without having recourse to any reducing reaction of the plutonium present in this phase; and secondly using, at the partitioning step, an organic phase containing an extractant which is more capable of extracting uranium(VI) than plutonium(IV) from an acid aqueous phase, and which therefore allows the transfer in this organic phase of all or part of the uranium initially present in the acid aqueous phase whilst leaving plutonium(IV) in this phase.

In the foregoing and in the remainder hereof, it is considered that an extractant is more capable of extracting uranium (VI) than plutonium(IV) from an acid aqueous phase when the coefficient of distribution of uranium(VI) obtained, during an extraction performed with this extractant, is greater than the coefficient of distribution of plutonium(IV) obtained during the same extraction, irrespective of the operating conditions under which this extraction is performed.

Similarly, it is considered that an extractant is more capable of extracting uranium(VI) and/or plutonium(IV) than americium, curium and/or fission products from an acid aqueous phase when the coefficients of distribution of uranium(VI) and/or plutonium(IV) obtained during an extraction performed with this extractant are greater than the coefficients of distribution of americium, curium and/or fission products that are obtained during the same extraction, irrespective of the operating conditions under which this extraction is performed.

In this respect, it is recalled that, in liquid-liquid extraction, the coefficient of distribution of a metallic element M, denoted $D_M$, corresponds to the ratio of its concentration in organic phase to its concentration in aqueous phase in equilibrium, i.e. $[M]_{org}/[M]_{aq}$.

The neptunium contained in the spent nuclear fuel is found in the nitric aqueous phase resulting from the dissolution of this fuel, chiefly in the oxidation states V and VI. Taking into account the similarity in behaviour, in aqueous and organic solutions, of uranium(VI) and neptunium(VI), the latter is unavoidably extracted in an organic phase by the first extractant, the effect of which is to displace the redox equilibrium existing between the two oxidation states V and VI of the neptunium towards the formation of neptunium(VI). As a result, the co-extraction of the uranium and plutonium at step a) is accompanied by an extraction of the neptunium unless provision is made for the neptunium to be in oxidation state V, during or prior to this co-extraction operation, so that it becomes scarcely or not extractable by the first extractant.

On the other hand, the redox equilibrium existing between the oxidation states V and VI of the neptunium is unavoidably displaced towards the formation of neptunium(V) via the processing to which the aqueous phase stemming from step b) is subjected in order to reduce the plutonium(VI) it contains to plutonium(IV), the effect of which is to make the neptunium present in this phase scarcely or not extractable by the second extractant.

This can advantageously be put to advantage to obtain an aqueous phase after step d) which contains:

either a mixture of purified plutonium and uranium also containing purified neptunium;

or a mixture of purified plutonium and uranium free of neptunium;

or purified plutonium free of uranium and neptunium;

or a mixture of purified plutonium and neptunium free of uranium.

Therefore in a first preferred embodiment of the process of the invention, it comprises at least the following steps:

a) decontaminating the uranium, plutonium and neptunium present in the nitric aqueous phase, resulting from the dissolution of the fuel, to remove americium, curium and most of the fission products also contained in this phase, which decontaminating comprises at least co-extracting the uranium (VI), plutonium(IV) and neptunium, in oxidation state VI, in the organic phase containing the first extractant;

b) co-stripping, in a nitric aqueous phase, the uranium, plutonium and neptunium co-extracted at step a), the uranium being stripped in oxidation state VI, the plutonium being stripped in oxidation states IV and VI and the neptunium being stripped in oxidation states V and VI;

c) partitioning the uranium, plutonium and neptunium present in the nitric aqueous phase stemming from step b) into a first aqueous phase containing a mixture of uranium, plutonium and neptunium, and a second aqueous phase containing uranium without either plutonium or neptunium, which partitioning at least comprises:

selectively extracting a fraction of the uranium, in oxidation state VI, in the organic phase containing the second extractant, this extracting being performed after treating the nitric aqueous phase stemming from step b) to reduce the plutonium(VI) present in this phase to plutonium(IV); and stripping, in a nitric aqueous phase, the uranium(VI) thus extracted; and d) purifying the mixture of uranium, plutonium and neptunium present in the aqueous phase stemming from the extraction of step c) to remove any fission products which may still be present in this phase.

In which case, step d) preferably at least comprises:

extracting the mixture of uranium, plutonium and neptunium present in the aqueous phase stemming from the extraction of step c), in oxidation states VI, IV and VI respectively, in an organic phase non-miscible with water and containing a third extractant which is different from the second extractant and which is more capable of extracting uranium(VI) and plutonium(IV) than the fission products from an acid aqueous phase; and stripping, in a nitric aqueous phase, the mixture of uranium (VI), plutonium(IV) and neptunium(VI) thus extracted.

For this purpose, the process of the invention advantageously comprises, during the extraction of step d), the processing of the nitric aqueous phase stemming from the extraction of step c) to displace the redox equilibrium existing between the oxidation states V and VI of neptunium towards the formation of neptunium(VI) and thereby facilitate the extraction of neptunium by the third extractant.

In a second preferred embodiment of the process of the invention, it comprises at least the following steps:

a) decontaminating the uranium and plutonium present in the nitric aqueous phase, resulting from the dissolution of the fuel, to remove the neptunium, americium, curium and most of the fission products also contained in this phase, which decontaminating comprises at least co-extracting the uranium (VI) and plutonium(IV) in the organic phase containing the first extractant, this co-extracting being performed after and/or jointly with processing of said nitric aqueous phase to displace the redox equilibrium existing between the oxidation states V and VI of neptunium towards the formation of neptunium(V);

b) co-stripping, in a nitric aqueous phase, the uranium and plutonium co-extracted at step a), the uranium being stripped in oxidation VI and the plutonium being stripped in oxidation states IV and VI;

c) partitioning the uranium and plutonium present in the nitric aqueous phase stemming from step b) into a first aqueous phase containing a mixture of uranium and plutonium and a second aqueous phase containing uranium without plutonium, which partitioning at least comprises:

selectively extracting a fraction of the uranium, in oxidation state VI, in the organic phase containing the second extractant, this extracting being performed after treating the aqueous phase stemming from step b) to reduce the plutonium(VI) present in this phase to plutonium(IV); and stripping, in a nitric aqueous phase, the uranium(VI) thus extracted; and d) purifying the mixture of uranium and plutonium present in the aqueous phase stemming from the extraction of step c) to remove any fission products which may still be present in this phase.

In this case, step d) preferably at least comprises:

extracting the mixture of uranium and plutonium present in the aqueous phase stemming from the extraction of step c), in oxidation states VI and IV respectively, in an organic phase non-miscible with water and containing a third extractant which is different from the second extractant and which is more capable of extracting uranium(VI) and plutonium(IV) than the fission products from an acid aqueous phase; and stripping, in a nitric aqueous phase, the mixture of uranium (VI) and plutonium(IV) thus extracted.

In a third preferred embodiment of the process of the invention, it comprises at least the following steps:

a) decontaminating of the uranium and plutonium present in the nitric aqueous phase resulting from the dissolution of the fuel, to remove the neptunium, americium, curium and most of the fission products also contained in this phase, which decontaminating at least comprises co-extracting the uranium(VI) and plutonium(IV) in the organic phase containing the first extractant, this co-extracting being conducted after and/or jointly with treating of said nitric aqueous phase to displace the redox equilibrium existing between the oxidation states V and VI of neptunium towards the formation of the neptunium(V);

b) co-stripping, in a nitric aqueous phase, the uranium and plutonium co-extracted at step a), the uranium being stripped in oxidation state VI and the plutonium being stripped in oxidation states IV and VI;

c) partitioning the uranium and plutonium present in the nitric aqueous phase stemming from step b) into a first aqueous phase containing plutonium without uranium and a second aqueous phase containing uranium without plutonium, which partitioning at least comprises:

selectively extracting all the uranium, in oxidation state VI, in the organic phase containing the second extractant, this extracting being performed after processing the aqueous phase stemming from step b) to reduce the plutonium(VI) present in this phase to plutonium(IV); and stripping, in a nitric aqueous phase, the uranium (VI) thus extracted; and d) purifying the plutonium present in the aqueous phase stemming from the extraction of step c) to remove any fission products which may still be present in this phase.

In which case, step d) preferably at least comprises:

extracting the plutonium present in the aqueous phase stemming from the extraction of step c), in oxidation state IV, in an organic phase non-miscible with water and containing a third extractant which is different from the second extractant and which is more capable of extracting plutonium(IV) than fission products from an acid aqueous phase; and stripping, in a nitric aqueous phase, the plutonium(IV) thus extracted.

In a fourth preferred embodiment of the process of the invention, it comprises at least the following steps:

a) decontaminating the uranium, plutonium and neptunium present in the nitric aqueous phase resulting from the dissolution of the fuel, to remove the americium, curium and most of the fission products also contained in this phase, which decontaminating at least comprises co-extracting the uranium (VI), plutonium(IV) and the neptunium, in oxidation state VI, in the organic phase containing the first extractant;

b) co-stripping, in a nitric aqueous phase, the uranium, plutonium and neptunium co-extracted at step a), the uranium being stripped in oxidation VI, the plutonium being stripped in oxidation states IV and VI and the neptunium being stripped in oxidation states V and VI;

c) partitioning the uranium, plutonium and neptunium present in the nitric aqueous phase stemming from step b) into a first aqueous phase containing a mixture of plutonium and neptunium without uranium and a second aqueous phase containing uranium without plutonium or neptunium, which partitioning at least comprises:

selectively extracting all the uranium, in oxidation state VI, in the organic phase containing the second extractant, this extracting being performed after processing the aqueous phase stemming from step b) to reduce the plutonium(VI) present in this phase to plutonium(IV); and stripping, in a nitric aqueous phase, the uranium(VI) thus extracted; and d) purifying the mixture of plutonium and neptunium present in the aqueous phase stemming from the extraction of step c) to remove any fission products which may still be present in this phase.

In which case, step d) preferably at least comprises:

extracting the mixture of plutonium and neptunium present in the aqueous phase stemming from the extraction of step c), in oxidation states IV and VI respectively, in an organic phase non-miscible with water and containing a third extractant which is different from the second extractant and which is more capable of extracting plutonium(IV) than fission products from an acid aqueous phase; and stripping, in a nitric aqueous phase, the mixture of plutonium(IV) and neptunium(VI) thus extracted.

For this purpose, the process of the invention advantageously comprises, during the extraction of step d), treating the nitric aqueous phase stemming from the extraction of step c) to displace the redox equilibrium existing between the oxidation states V and VI of the neptunium to the formation of neptunium(VI).

Irrespective of the embodiment used of the process of the invention, preferably the same extractant is used as first and third extractant, so as to simplify the management of the organic effluents which they produce.

This extractant is preferably a trialkyl phosphate and better still the tri-n-butyl phosphate (or TBP) which is typically used in a proportion of 30% (v/v) in an organic diluent of hydrocarbon mixture type, in particular hydrogenated tetrapropylene (TPH) as in the PUREX process.

However, it is also possible to use two different extractants and to choose one and/or the other of these extractants from the extractants of the N,N-dialkylamide family having the general formula RC(O)N(R')$_2$, where R is a branched alkyl group at position β of the carbonyl group such as N,N-di(2-ethylhexyl)-n-butanamide (or DEHBA) for example or N,N-di-(2-ethylhexyl)-3,3-dimethylbutanamide (or DEHDMBA).

The second extractant is preferably chosen from the N,N-dialkylamides having the same formula as previously but in which R is a branched alkyl group at position α of the carbonyl group, such as N,N-di-(2-ethylhexyl)isobutanamide (or DEHiBA) or N,N-di-(2-ethylhexyl)-2,2-dimethylpropanamide (DEHDMPA) for example, which are known to have more affinity for uranium(VI) than for plutonium(IV).

However, here again, it is possible to choose the second extractant from the trialkyl phosphates which have branched alkyl groups such as the tri-tert-butyl phosphate for example.

Among the N,N-dialkylamides, special preference is given to DEHiBA whose selectivity for uranium(VI) is particularly high since, as an example, the coefficients of distribution $D_{U(VI)}$ and $D_{Pu(IV)}$ obtained with this extractant are 2.7 and 0.03 respectively (i.e. a partitioning factor of about 90) in the presence of a 3 M nitric medium, and preferably it is used at a concentration ranging from 0.5 to 2 moles/L, further preferably from 1 to 1.5 mole/L, in an organic diluent.

This diluent can be indifferently chosen from the numerous polar or aliphatic organic diluents whose use has been proposed for reprocessing irradiated nuclear fuel, such as toluene, xylene, t-butylbenzene, triisopropylbenzene, kerosene, dodecanes (n-dodecane, hydrogenated tetrapropylene, isoparaffins (for example, Isane IP 185), metanitrobenzotrifluoride and 5,5'-[oxy-bis-(methyleneoxy)]bis-(1,1,2,2,3,3,4,4-octafluoropentane).

However, here again for the purpose of simplifying the implementation of the process of the invention, preferably the same diluent is used as for the first and third extractants, and it is therefore a mixture of hydrocarbons such as TPH if TBP is used as first and third extractant.

Also, irrespective of the embodiment of the process of the invention, the treatment applied to the nitric aqueous phase stemming from step b) to reduce plutonium(VI) to plutonium (IV) preferably comprises adding of nitrous acid to this phase, e.g. by injecting nitrous vapours.

Similarly, the treatment applied to control the oxidation state of neptunium in the previously described different embodiments of the process, advantageously comprises a judiciously chosen addition of nitrous acid e.g. by injecting nitrous vapours.

For example, in the first and fourth embodiments of the process—in which it is desired to obtain, after step d), a mixture containing neptunium together with uranium and plutonium, or only with plutonium—the addition of nitrous acid in a suitable amount, typically of the order of $10^{-4}$ to $10^{-3}$ M, during the extraction operation of step d), allows the redox equilibrium existing between the oxidation states V and VI of neptunium to be displaced towards the formation of neptunium(VI) thereby promoting the extraction thereof by the third extractant. This addition is not necessary for the co-extraction of step a), experience having effectively shown that at this stage of the process the nitrous acid is present in sufficient amount on account of the strong activity of the nitric aqueous solutions being processed.

In the second and third embodiments of the process—in which it is desired, on the contrary, to obtain after step d) a mixture of uranium and plutonium or plutonium alone, free of neptunium, the addition of nitrous acid in sufficient amount, typically of the order of 0.01 to 0.1 M, before starting the co-extraction of step a) and/or during this co-extraction, allows the redox equilibrium existing between the oxidation states V and VI of neptunium to be displaced towards the formation of neptunium(V), which cannot be extracted by the first extractant.

Advantageously, the process of the invention additionally comprises an operation for concentrating the nitric aqueous phase stemming from step b) and/or an operation for concentrating the nitric aqueous phase stemming from the extraction of step c), so as to reduce the volume of the organic phases needed for performing steps c) and d).

Other advantages and characteristics of the invention will become apparent on reading the remainder of the description which follows, and which refers to examples of embodiments of the process on an industrial scale.

Evidently, these examples are only given by way of illustration of the invention and are in no way limiting.

In these figures, the rectangles referenced 1 to 11 represent multi-staged extractors such as those conventionally used for reprocessing spent nuclear fuels (mixers-settlers, pulsed columns, centrifugal extractors).

The organic phases entering and leaving these extractors are symbolised by double lines, whilst the aqueous phases entering and leaving these extractors are symbolised by single lines.

DETAILED DESCRIPTION OF PARTICULAR EMBODIMENTS

Figure 1:
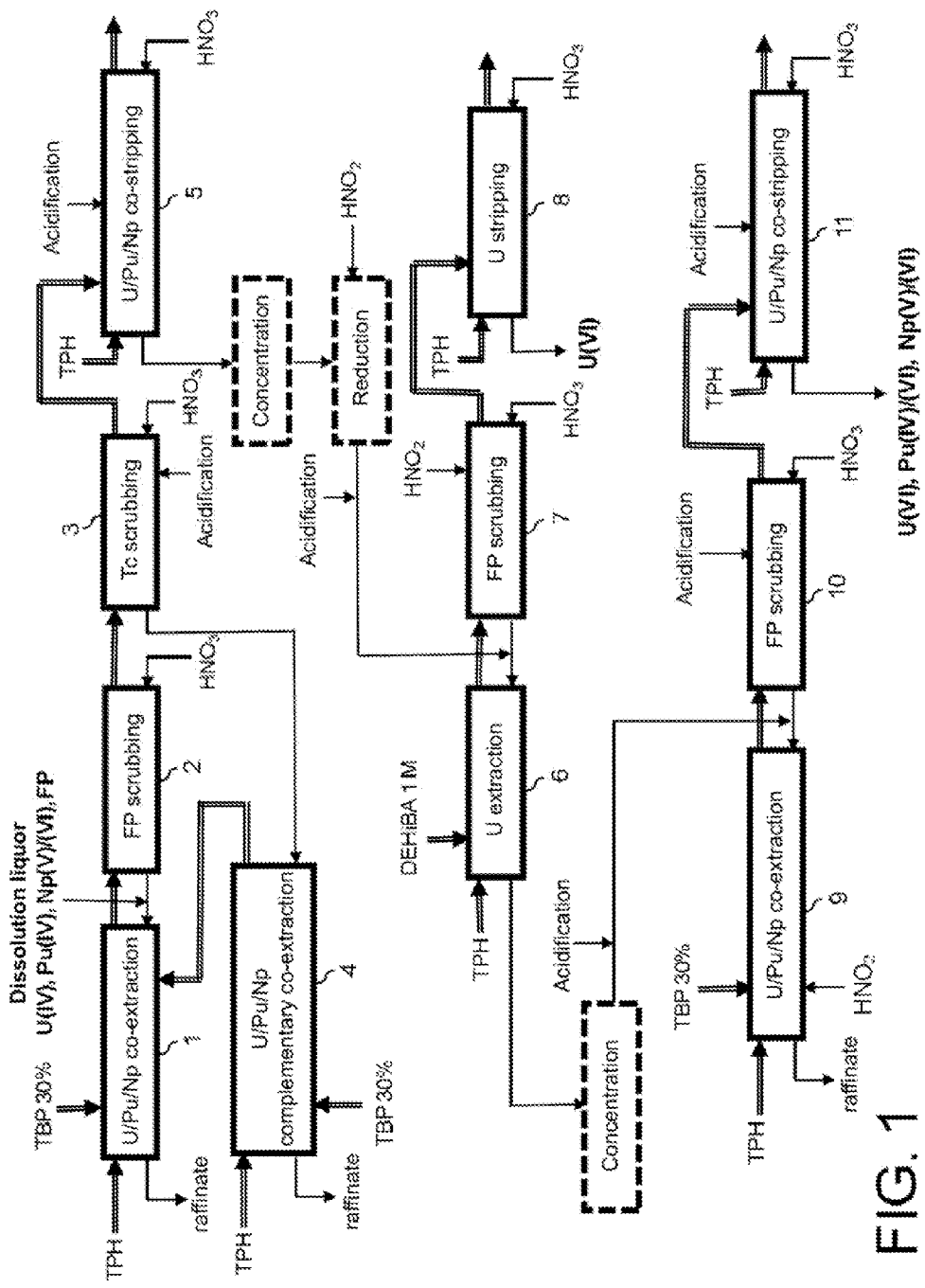
FIG. 1 illustrates a flow chart of one preferred embodiment of the process of the invention, designed firstly to produce a mixture of uranium, plutonium and neptunium able to be converted to a mixed oxide $(U,Pu,Np)O_2$, and secondly to produce uranium of sufficient purity for conversion thereof to $UO_2$.

With reference firstly to FIG. 1 which is a flow diagram of one preferred embodiment of the process of the invention designed to produce, from a dissolution liquor of a spent nuclear fuel, e.g. $UO_2$, firstly a mixture of uranium, plutonium and neptunium able to be converted to a mixed oxide $(U,Pu,Np)O_2$, and secondly uranium able to be converted to $UO_2$.

This dissolution liquor which is obtained by dissolving the spent nuclear fuel in concentrated nitric acid (6 to 10 M), followed by settling the resulting mixture, typically contains 200 to 300 g/L of uranium per 2 to 3 g/L of plutonium.

It also contains minor actinides including neptunium, americium and curium, as well as fission products (lanthanum, cerium, praseodymium, neodymium, samarium, europium, yttrium, molybdenum, zirconium, rubidium, ruthenium, palladium, strontium, etc.).

In this embodiment the process of the invention comprises, as first step, a step for decontaminating the uranium, plutonium and neptunium from the actinides(III) (americium et curium) and most of the fission products, and which is preferably conducted in the same manner as the decontaminating step in the PUREX process such as implemented at the UP2-800 plant in La Hague.

Therefore this step, optionally after adjustment of the acidity of the dissolution liquor to bring this acidity to a value of 4 to 6 M, comprises:

an operation called « U/Pu/Np co-extraction », which is intended to extract jointly the uranium, plutonium and neptunium, the first in oxidation state VI, the second in oxidation state IV and the third in oxidation state VI, from the dissolution liquor, by contacting this liquor with an organic phase containing 30% (v/v) TBP in an organic diluent, e.g. TPH, and during which the redox equilibrium existing between the oxidation states V and VI of neptunium in aqueous phase is displaced towards the formation of neptunium(VI) on account of the extraction thereof by the organic phase, which leads to an extraction of the neptunium which may be quantitative if the oxidation reaction kinetics of neptunium(V) are sufficiently fast;

an operation called « FP scrubbing », which is intended to remove from the organic phase stemming from the « U/Pu/Np co-extraction » operation, the fission products and, in particular, the ruthenium and zirconium which were extracted during this co-extraction, by contacting this organic phase with a nitric aqueous phase of moderate acidity, for example a 0.5 to 3 M aqueous solution of nitric acid;

an operation called « Tc scrubbing », which is intended to remove from the organic phase stemming from the « FP scrubbing » the technetium which was extracted during the « U/Pu/Np co-extraction », by contacting this organic phase with a nitric aqueous phase of high acidity, for example a 4 to 5 M nitric acid solution; and an operation called « U/Pu/Np complementary co-extraction », which is intended to recover in an organic phase the fractions of uranium, plutonium and neptunium which followed the technetium in aqueous phase during the « Tc scrubbing », by contacting this aqueous phase with an organic phase which is also formed of 30% (v/v) TBP in TPH.

In this manner, four phases are obtained:

the two aqueous phases (or raffinates) stemming from the « U/Pu/Np co-extraction » and the « U/Pu/Np complementary co-extractio », one of which is loaded with actinides(III) and various fission products, and the other with technetium, and which are eliminated from the cycle;

the organic phase stemming from the « U/Pu/Np complementary extraction », which is sent to extractor 1 to be added to the organic phase circulating in this extractor; and the organic phase stemming from the « Tc scrubbing », which contains uranium(VI), plutonium(IV), neptunium(VI), and traces of fission products.

This latter organic phase is directed towards extractor 5 in which the second step of the process is performed.

This second step, which is called « U/Pu/Np co-stripping » in FIG. 1, is intended to strip jointly the uranium, plutonium and neptunium from the organic phase stemming from the « Tc scrubbing » without having any recourse to a plutonium reducing reaction.

It is therefore conducted by placing this organic phase in contact with a nitric aqueous phase which is of very low acidity on entering extractor 5, for example 0.01 to 0.05 M, but whose acidity is increased throughout the operation, for example through the addition of 12 M nitric acid, so that this acidity is of the order of 0.3 to 0.6 M on leaving extractor 5 to prevent hydrolysis of the plutonium.

This aqueous phase can be heated, for example to a temperature of the order of 50° C., to reduce the extractability of the uranium, plutonium and neptunium by TBP and thereby to promote the transfer of these elements in aqueous phase.

At the end of this step, the following are therefore obtained:
an organic phase which no longer contains any uranium, plutonium, neptunium or fission products and which is directed towards a series of extractors (not illustrated in FIG. 1) in which it is subjected to a purification for recycling thereof; and
an aqueous phase which contains uranium(VI), plutonium which is mostly in oxidation state IV but of which a fraction is in oxidation state VI—on account of the tendency of plutonium(IV) to dismute in an aqueous medium, all the more so in a medium that is heated and of low acidity—neptunium(V), neptunium(VI) and traces of fission products.

This aqueous phase is then concentrated to reduce its volume, for example by evaporation.

It is then subjected to a reducing operation, for example through the addition of nitrous acid ($HNO_2$) to the vessel in which it is contained, before being directed towards extractors 6 to 8 in which the third step of the process takes place, namely the partitioning step.

The adding of nitrous acid, conducted for example by injecting nitrous vapours, allows the reducing of plutonium (VI) to plutonium(IV) and the displacing of the redox equilibrium existing between the oxidation states V and VI of neptunium towards the formation of neptunium(V), the effect of which is to reduce the extractability of the plutonium and neptunium by DEHiBA, which is the extractant chosen for performing the partitioning step, thereby preventing them from following the uranium during this partitioning step.

As can be seen in FIG. 1, the partitioning step, optionally after adjusting the acidity of the aqueous phase stemming from the reducing operation to bring this acidity to a value of 4 to 6 M, comprises:
an operation called « U extraction », which is intended to extract from this aqueous phase a fraction of the uranium (VI) it contains, by contacting with an organic phase containing, for example, 0.5 to 2 moles/L of DEHiBA in a dodecane such as TPH;
an operation called « FP scrubbing », which is intended to remove from the organic phase the fission products and the fractions of plutonium and neptunium which were extracted during the « U extraction », by contacting this organic phase with a nitric aqueous phase of moderate acidity, for example of 0.5 to 3 M, and which, as a precaution, comprises an addition of nitrous acid to reduce the neptunium(VI)—which may be present in the organic phase on account of a possible displacement of the redox equilibrium existing between the oxidation states V and VI of the neptunium—to neptunium(V); and
an operation called « U stripping », which is intended to strip the uranium present in the organic phase stemming from the « FP scrubbing », by contacting this organic phase with a nitric aqueous phase of low acidity, e.g. a 0.01 to 0.03 M nitric acid solution.

Here also this aqueous phase can be heated, for example to a temperature of the order of 50° C., to reduce the extractability of the uranium by DEHiBA and thereby to promote its transfer in aqueous phase.

In this manner, three phases are obtained:
the organic phase stemming from the « U stripping », which no longer contains either uranium, plutonium, neptunium or fission products and which is directed towards a series of extractors (not illustrated in FIG. 1) in which it will be subjected to a purification for recycling thereof;
the aqueous phase stemming from the « U stripping », which contains uranium(VI) whose degree of purity is sufficient so that it can be considered to be an end product, able to converted to uranium oxide without any additional purification operation, and which therefore exits the cycle; and
the aqueous phase stemming from the « U extraction », which contains uranium(VI), plutonium(IV) and neptunium(V) and traces of fission products.

This aqueous phase is then concentrated to reduce its volume, e.g. by evaporation.

After this concentration, this aqueous phase contains uranium(VI), plutonium which is mostly in oxidation state IV but of which part is in oxidation state VI due to the tendency of plutonium(IV) to dismute in aqueous phase, neptunium(V) and neptunium(VI).

After an optional acidification to bring its acidity to a value of 4 to 5 M, this phase is directed towards the extractors 9 to 11 in which the fourth step of the process takes place, namely the purification step.

As can be seen in FIG. 1, this purification step comprises:
an operation called « U/Pu/Np co-extraction », which is intended to extract jointly the uranium(VI), plutonium (IV), plutonium(VI) and neptunium from the aqueous phase stemming from the concentration operation, which is conducted by placing this aqueous phase in contact with an organic phase containing 30% (v/v) TBP in TPH, and during which the neptunium is extracted quantitatively in the form of neptunium(VI) according to the same mechanisms as those involved in the « U/Pu/Np co-extraction » of the decontaminating step but with an addition of nitrous acid (e.g. by injecting nitrous vapours into the extractor 9) in an amount allowing the catalysing of the oxidation of neptunium(V) to neptunium(VI);
an operation called « FP scrubbing », which is intended to remove from the organic phase those fission products which were extracted during the « U/Pu/Np co-extraction », by contacting this organic phase with a nitric aqueous phase which is of moderate acidity when entering extractor 10, for example a 1 to M solution of nitric acid, but whose acidity is increased throughout the operation, for example through the addition of 12 M nitric acid, so that it is between 3 and 5 M on leaving extractor 10; and
an operation called « U/Pu/Np co-stripping », which is intended to strip jointly the uranium, plutonium and neptunium from the organic phase stemming from the « FP scrubbing », here again without having any recourse to a plutonium reducing reaction, and which is therefore conducted by contacting this organic phase with an aqueous phase of very low acidity when it enters extractor 11, for example from 0.01 to 0.05 M, and whose acidity is increased throughout the operation, for example through the addition of 12 M nitric acid, so that this acidity is of the order of 0.3 to 0.5 M on leaving the extractor 11.

As previously, this aqueous phase can be heated, for example to a temperature of the order of 50° C., to reduce the extractability of the uranium and plutonium by TBP.

In this manner, three phases are obtained:
the aqueous phase stemming from the « U/Pu/Np co-extraction » (or raffinate), which contains fission products and which is eliminated from the cycle;
the organic phase stemming from the « U/Pu/Np co-stripping », which no longer contains either uranium, plutonium, neptunium or fission products and which is directed towards the series of extractors dedicated to the purification of the organic phases containing TBP; and
the aqueous phase stemming from the « U/Pu/Np co-stripping », which contains a mixture of uranium(VI), plutonium(IV), plutonium(VI), neptunium(V) and neptunium(VI), whose degree of purity is sufficient for this phase to be sent, after optional adjustment of its uranium (VI) content through the addition of uranyl nitrate and/or optional storage, towards a plant unit able to convert this mixture to a mixed oxide $(U,Pu,Np)O_2$.

For reasons relating to safe implementation of the process of the invention, it is preferably guaranteed that the plutonium is not entrained in the organic phases stemming from the « U/Pu/Np co-stripping » operations that are carried out in extractors 5 and 11 respectively.

For this purpose, it is possible to complete each of these co-stripping operations with an operation (not illustrated in FIG. 1) which consists of removing from these organic phases any traces of plutonium which they may contain, which most often correspond to complexes formed of plutonium and TBP degradation products such as di-n-butyl phosphate.

In this case, this operation may consist of:
either placing the organic phases stemming from the aforementioned « U/Pu/Np co-stripping » operations in contact with a nitric aqueous phase of low to moderate acidity, for example a 0.05 to 2 M nitric acid solution, which contains an agent capable of reducing plutonium (IV) to plutonium(III), such as uranous nitrate for example, and an anti-nitrous agent such as hydrazine;
or placing these organic phases in contact with a nitric aqueous phase, also of low to moderate acidity but containing a lacunar heteropolyanion and, in particular, a heterotungstate of type $P_2W_{17}O_{61}^{10-}$, $As_2W_{17}O_{61}^{10-}$, $SiW_{11}O_{39}^{8-}$, $GeW_{11}O_{39}^{8-}$ or $PW_{11}O_{39}^{7-}$ as described in the PCT international application published under number WO 2005/052950 (reference [2]).

It is also noted that this type of operation, when applicable, also allows the organic phase to be decontaminated from neptunium.

There is normally no need to make similar provisions for the partitioning step unless this step is conducted using a trialkyl phosphate as extractant, in which case an operation similar to the operation just described is advantageously carried out both downstream of the « FP scrubbing » of this step and upstream of the « U stripping » (the terms « downstream » and « upstream » being considered here in relation to the direction of circulation of the organic phase) in order to guarantee the absence of any traces of plutonium and neptunium in the aqueous phase stemming from this « U stripping ».

It is to be noted that when a reducing agent such as uranous nitrate is used in operations intended solely to prevent plutonium in trace form being entrained in a phase, the streams of reducing agent used in these operations bear no comparison with those required to strip plutonium in aqueous phase in the first and second cycles of the PUREX process or which would be needed to perform these stripping operations in the COEX™ process. They therefore do not generate the constraints previously set forth in connection with these processes.

Also, to ensure the stable operation of the process of the invention, it is also preferable to prevent the transporting of extractant between the steps of this process which do not use the same extractant, i.e. between the second and third steps and between the third and fourth steps.

For this purpose, it is possible to make provision for:
a scrubbing operation (illustrated in FIG. 1) of the aqueous phase stemming from the « U/Pu/Np co-stripping » step taking place in extractor 5 with TPH before this aqueous phase is concentrated, for the extraction in organic phase of the extractant present in aqueous phase; and
a scrubbing operation (illustrated in FIG. 1) of the aqueous phase stemming from the « U extraction » conducted in extractor 6 with TPH before this aqueous phase is concentrated;
bearing in mind that, in both cases, the fact that the scrubbed aqueous phase is then concentrated allows the removal via steam entrainment and even the destruction of any residual traces of extractant.

In FIG. 1, these scrubbings with TPH are illustrated by the addition of TPH upstream of the introduction of the organic phase in extractors 5 and 6.

Scrubbings with diluent can also be carried out on the aqueous phases containing the end products and raffinates as shown in the schemes, to reduce the entrainments of extractant in these streams.

Figure 2:
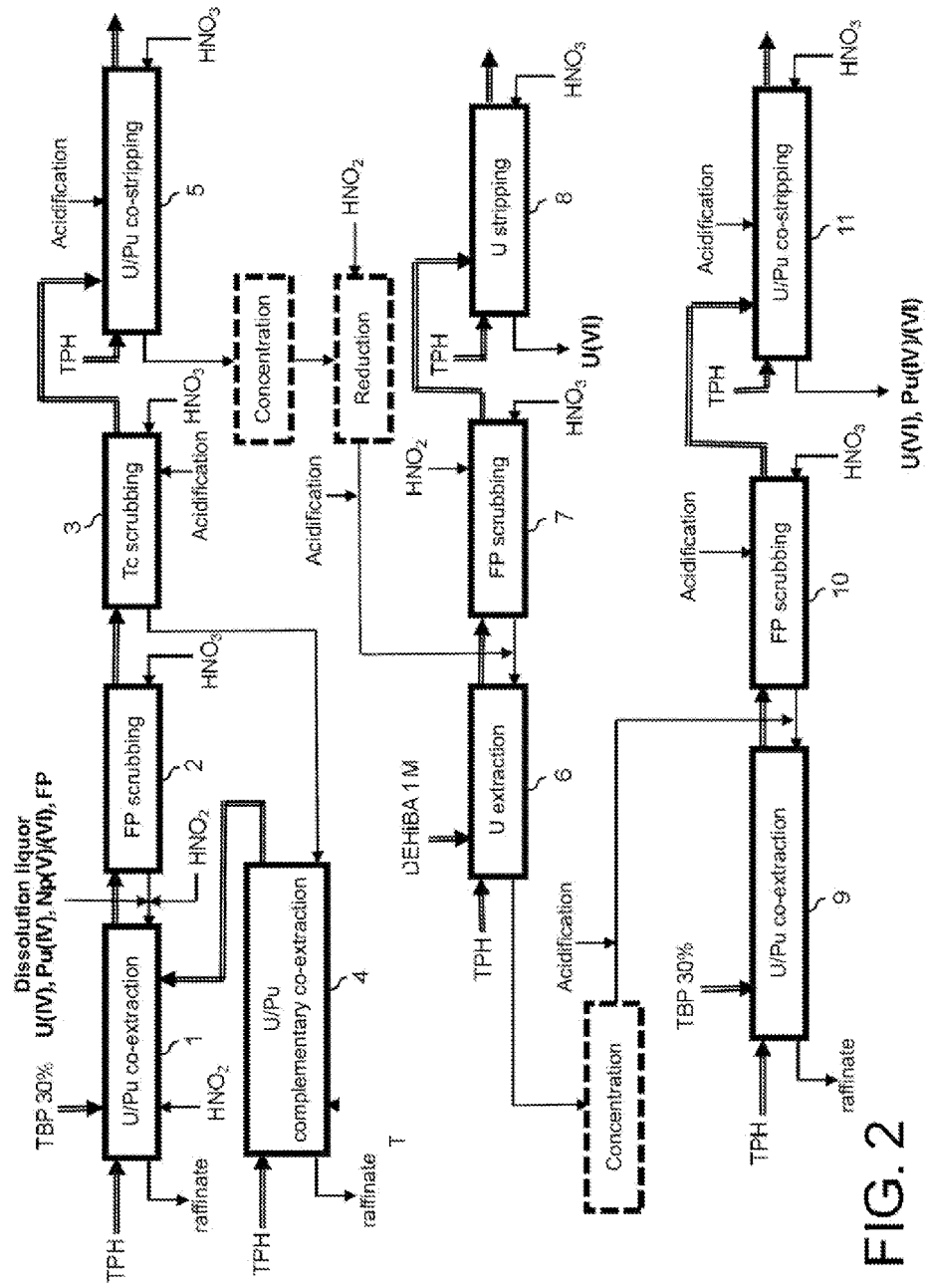
FIG. 2 is a flow chart of a first variant of the embodiment illustrated in FIG. 1, designed to produce firstly a mixture of uranium and plutonium able to be converted to a mixed oxide $(U,Pu)O_2$, and secondly to produce uranium of sufficient purity for conversion thereof to $UO_2$.

Reference is now made to FIG. 2 giving a flow diagram of a first variant of the embodiment illustrated in FIG. 1, which allows to produce firstly a mixture of uranium and plutonium able to be converted to a mixed oxide $(U,Pu)O_2$, and secondly uranium able to be converted to $UO_2$.

This variant differs from the embodiment illustrated in FIG. 1 in that the co-extraction operation which takes place in extractor 1 is performed by making an addition of nitrous acid, e.g. through the injection of nitrous vapours into the vessel containing the dissolution liquor and into this extractor, in an amount allowing the redox equilibrium existing between the oxidation states V and VI of neptunium to be displaced towards neptunium(V), thereby preventing the extraction thereof by the TBP of the organic phase.

On this account, in this variant, the neptunium is not extracted from the dissolution liquor but is eliminated from the cycle right after the decontamination step, together with the actinides(III), and all the operations downstream of the decontamination step take place without neptunium.

Therefore:
the « U/Pu/Np co-stripping » step which is illustrated in FIG. 1 is replaced by a so-called « U/Pu co-stripping » step, which is intended to strip jointly the uranium and the plutonium from the organic phase stemming from the « Tc scrubbing » and which is performed in the same manner as the « U/Pu/Np co-stripping » step which is illustrated in FIG. 1;
the reducing operation, which is positioned just before the partitioning step illustrated in FIG. 1, then solely has the purpose of reducing the plutonium(VI) contained in the aqueous phase stemming from the preceding concentration operation to plutonium(IV); whilst
the operations of the purification step illustrated in FIG. 1 are replaced by:

an operation called «U/Pu co-extraction», which is intended to extract jointly the uranium(VI), plutonium(IV) and plutonium(VI) from the aqueous phase stemming from the concentration operation;

an operation called «FP scrubbing», which is intended to remove from the organic phase those fission products which were extracted during the «U/Pu extraction»; and an operation called «U/Pu co-stripping», which is intended to strip jointly the uranium, plutonium and the plutonium from the organic phase stemming from the «FP scrubbing»;

these three operations being performed in the same manner as the «U/Pu/Np co-extraction», «FP scrubbing» and «U/Pu/Np co-stripping» operations of the purification step illustrated in FIG. 1, with the exception that the «U/Pu co-extraction» operation is conducted without any nitrous acid addition.

In this manner, at the end of the «U/Pu co-stripping», an aqueous phase is obtained which contains a mixture of uranium(VI), plutonium(IV) and plutonium(VI), whose degree of purity is sufficient for this phase to be sent, after optional adjustment of its uranium(VI) content through the addition of uranyl nitrate and/or optional storage, towards a plant unit able to covert this mixture to a mixed oxide$(U,Pu)O_2$.

Figure 3:
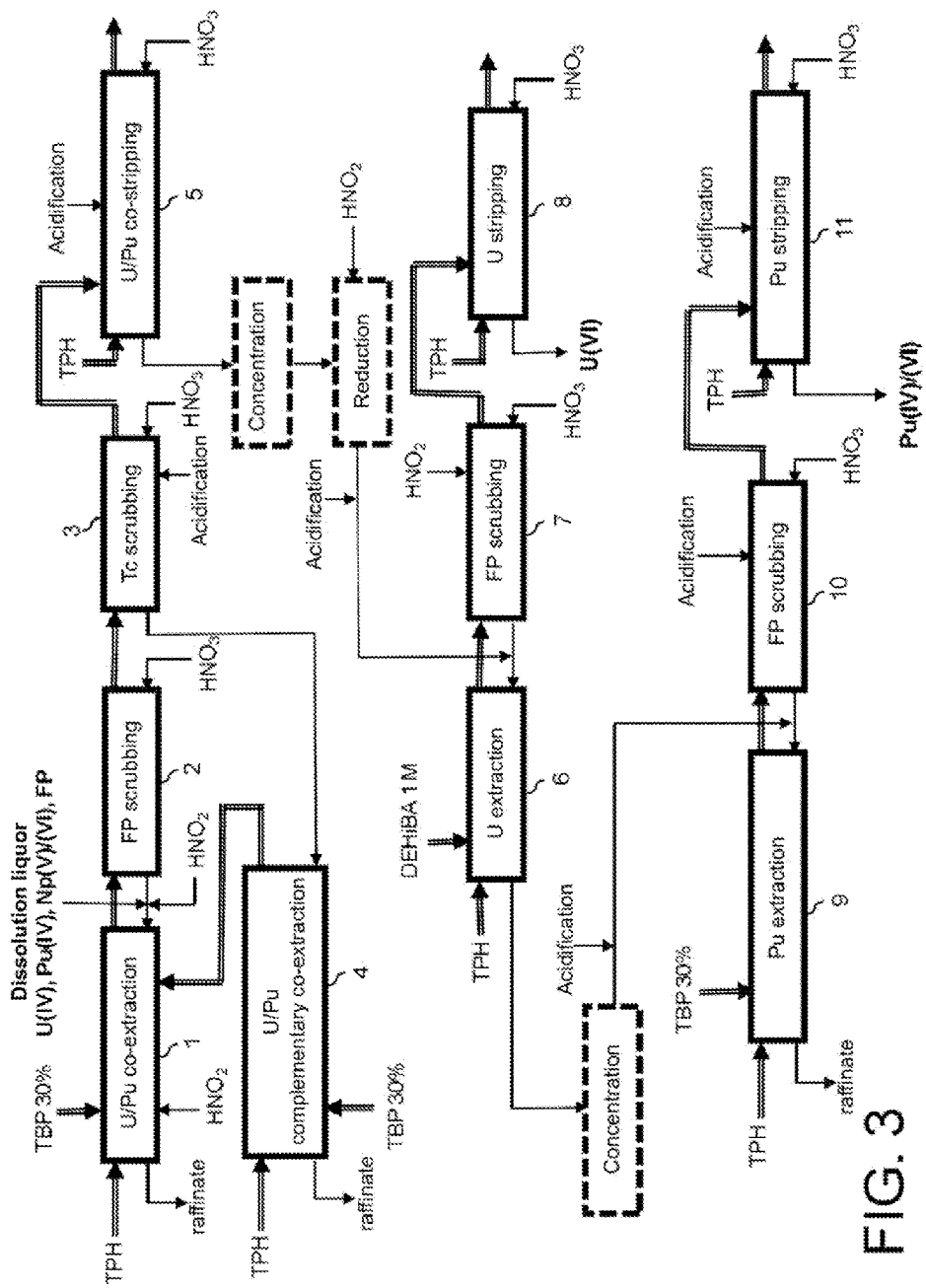
FIG. 3 is a flow chart of a second variant of the embodiment illustrated in FIG. 1, designed to produce firstly plutonium able to be converted to $PuO_2$, and secondly to produce uranium of sufficient purity for conversion thereof to $UO_2$.

With reference now to FIG. 3 which gives a flow diagram of a second variant of the embodiment illustrated in FIG. 1, which allows to produce firstly plutonium able to be converted to $PuO_2$ and secondly uranium able to be converted to $UO_2$.

This variant differs from the embodiment illustrated in FIG. 1 in that:

not only is the co-extraction operation taking place in extractor 1 conducted with the addition of nitrous acid, for example by injecting nitrous vapours into the vessel containing the dissolution liquor and into this extractor, so as to reduce the neptunium(VI) present in this liquor to neptunium(V) and thereby prevent the extraction thereof by the TBP of the organic phase, but in addition the «U extraction», operation which is conducted in extractor 6 is intended to extract all the uranium present in the aqueous phase stemming from the reducing operation, which is possible using a sufficient number of theoretical stages and a sufficient organic phase flow rate.

Therefore, for example, for a scheme like the one given in the example below, in which 8 extraction stages are used (extractor 6) and 8 scrubbing stages (extractor 7) with an organic phase flow rate leading to a U/Pu ratio of 0.55 in the aqueous phase stemming from the «U extraction», it is sufficient—all other parameters being equal—to increase by 10% the flow rate of the organic phase (DEHiBA) entering the extractor 6 to extract the uranium quantitatively and to obtain at the output of this extractor an aqueous phase which only contains plutonium.

Therefore, not only do all the operations downstream of the decontamination step take place without neptunium (as in the variant illustrated in FIG. 2) but, in addition, the operations of the purification step illustrated in FIG. 1 are replaced by:

an operation called «Pu extraction», which is intended to extract the plutonium(IV) from the aqueous phase stemming from the concentration operation;

an operation called «FP scrubbing», which is intended to remove from the organic phase those fission products which were extracted during the «Pu extraction»; and an operation called «Pu stripping», which is intended to strip the plutonium from the organic phase stemming from the «FP scrubbing»;

these operations being performed in the same manner as the «U/Pu/Np co-extraction», «FP scrubbing» and «U/Pu/Np co-stripping» operations of the purification step illustrated in FIG. 1, with the exception that the «U/Pu extraction» operation is conducted without the addition of nitrous acid.

Therefore, after the «Pu stripping» step, an aqueous phase is obtained which contains plutonium(IV) and plutonium (VI), whose degree of purity is sufficient for this phase to be sent, after optional storage, towards a plant unit able to convert this plutonium to $PuO_2$.

Figure 4:
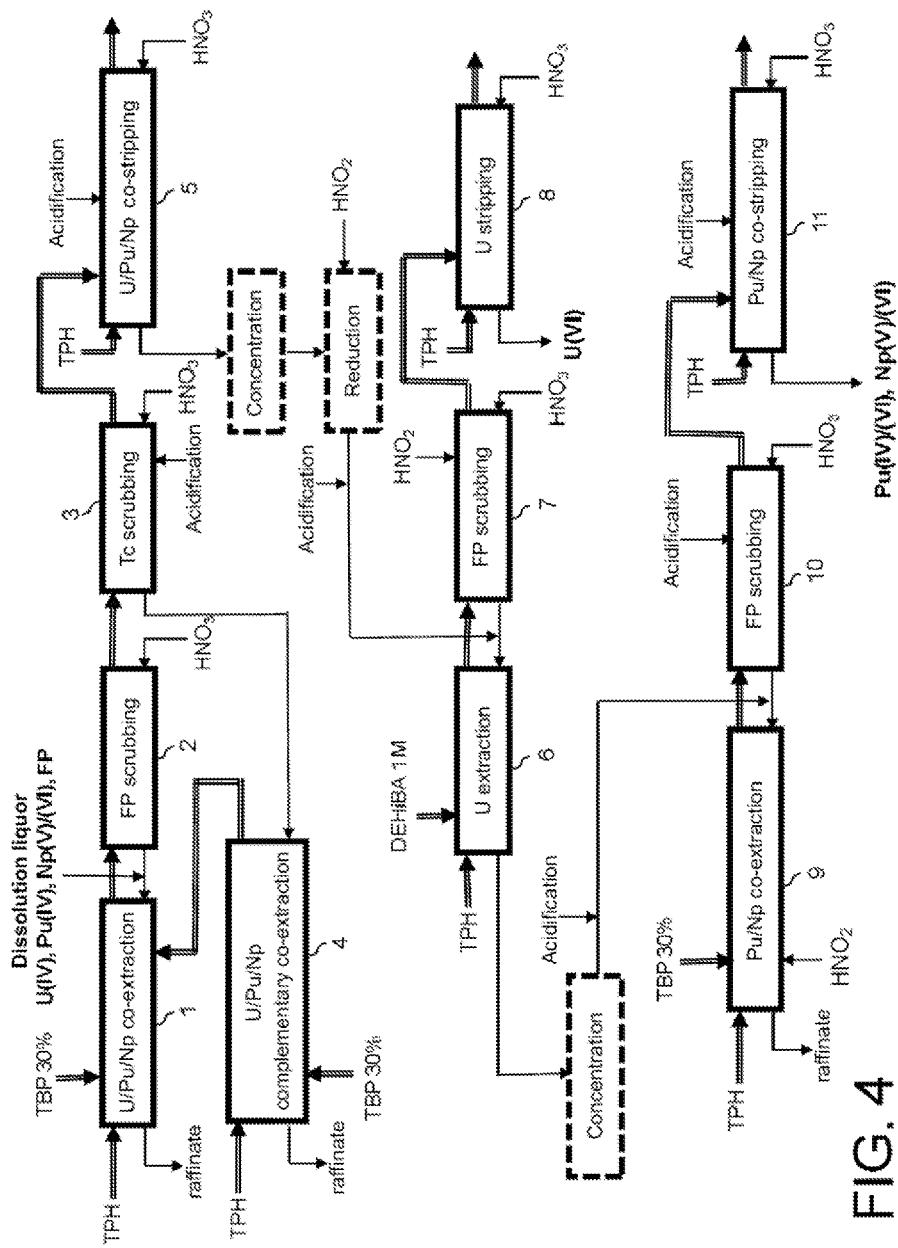
FIG. 4 is a flow chart of a third variant of the embodiment illustrated in FIG. 1, designed to produce firstly a mixture of plutonium and neptunium able to be converted to $(Pu,Np)O_2$, and secondly to produce uranium of sufficient purity for conversion thereof to $UO_2$.

With reference now to FIG. 4 giving a flow diagram of a third variant of the embodiment illustrated in FIG. 1, which allows to produce firstly plutonium and neptunium able to be converted to $(Pu,Np)O_2$, and secondly uranium able to be converted to $UO_2$.

This variant differs from the embodiment illustrated in FIG. 1 in that the «U extraction» operation which takes place in extractor 6 is intended, as in the preceding variant, to extract all the uranium present in the aqueous phase stemming from the reducing operation.

On this account, the operations of the purification step illustrated in FIG. 1 are replaced by:

an operation called «Pu/Np co-extraction», which is intended to extract the plutonium(IV) and neptunium from the aqueous phase stemming from the concentration operation;

an operation called «FP scrubbing», which is intended to remove from the organic phase those fission products which were extracted during the «Pu/Np co-extraction»; and an operation called «Pu/Np co-stripping», which is intended to strip jointly the plutonium and neptunium from the organic phase stemming from the «FP scrubbing»;

these operations being performed in the same manner as the «U/Pu/Np co-extraction», «FP scrubbing» and «U/Pu/Np co-stripping» operations of the purification step illustrated in FIG. 1.

In this manner, after the «Pu/Np co-stripping», an aqueous phase is obtained which contains a mixture of plutonium (IV), plutonium(VI), neptunium(V) and neptunium(VI), whose degree of purity is sufficient for this phase, after optional storage, to be sent to a plant unit able to convert this mixture to a mixed oxide $(Pu,Np)O_2$.

For example, a simulation was carried out using the PAREX software by COMMISSARIAT A L'ENERGIE ATOMIQUE for the embodiment of the process of the invention illustrated in FIG. 1.

The data for this simulation are the following:

Dissolution Liquor:
[U]=250 g/L
[Pu]=3.02 g/L
[Np]=0.24 g/L
[$HNO_3$]=4.5 M
Input flow rate into extractor 1=637 L/h Decontamination Step:
Organic phase entering extractor 1: 30% (v/v) TBP in TPH circulating at a flow rate of 1272 L/h;
Aqueous phase entering extractor 2: 2 M solution of $HNO_3$ circulating at a flow rate of 273 L/h;
Aqueous phase entering extractor 3: 1.5 M aqueous solution of $HNO_3$ circulating at a flow rate of 304 L/h, then acidified through the addition of a 12 M solution of $HNO_3$ circulating at a flow rate of 243 L/h;

Organic phase entering extractor 4: 30% (v/v) TBP in TPH circulating at a flow rate of 545 L/h;

Co-Stripping Step of Uranium and Plutonium:

Aqueous phase entering extractor 5: 0.01 M solution of $HNO_3$ circulating at a flow rate of 2317 L/h, then acidified through the addition of a 12 M solution of $HNO_3$ circulating at a flow rate of 75 L/h; temperature=50° C.;

Aqueous phase leaving extractor 5: [U]=65 g/L; [Pu]=0.78 g/L; [Np]=0.062 g/L; presence of Pu(VI); flow rate=2450 L/h;

Partitioning Step:

Aqueous phase entering extractor 6: [U]=314 g/L; [Pu(IV)]=3.8 g/L; [Np]=0.3 g/L; [$HNO_3$]=5 M; flow rate=508 L/h;

Organic phase entering extractor 6: 1.5 M % DEHiBA (v/v) in TPH circulating at a flow rate of 1379 L/h;

Aqueous phase entering extractor 7: 1.5 M solution of $HNO_3$ circulating at a flow rate of 226 L/h; addition of $HNO_2$;

Aqueous phase entering extractor 8: 0.01 M solution of $HNO_3$ circulating at a flow rate of 735 L/h; temperature=50° C.;

Aqueous phase leaving extractor 8: [U]=200 g/L;

Aqueous phase leaving extractor 6: [U]=1.56 g/L; [Pu]=2.85 g/L; [Np]=0.228 g/L; flow rate of 677.7 L/h;

Purification Step:

This step takes place after a concentration operation and acid adjustment of the production stream resulting from the preceding step.

Aqueous phase entering extractor 9: [U]=23.6 g/L; [Pu]=43 g/L; [Np]=3.45 g/L; [$HNO_3$]=4.8 M; flow rate=44.9 L/h;

Organic phase entering extractor 9: 30% (v/v) TBP in TPH circulating at a flow rate of 60 L/h;

Aqueous phase entering extractor 10: 1.5 M solution of $HNO_3$ circulating at a flow rate of 12 L/h then acidified through the addition of a 10 M solution of $HNO_3$ circulating at a flow rate of 3 L/h;

Aqueous phase entering extractor 11: 0.01 M solution of $HNO_3$ circulating at a flow rate of 66.9 L/h then acidified through the addition of a 10 M solution of $HNO_3$ circulating at a flow rate of 2.1 L/h; temperature=40° C.;

Aqueous phase leaving extractor 11: [U]=15 g/L; [Pu]=27.4 g/L; [Np]=2.2 g/L; [$HNO_3$]=0.5 M; Flow rate=70.6 L/h.

In this manner, an aqueous phase is obtained which contains a mixture comprising 15 g/L of uranium, 27.4 g/L of plutonium and 2.2 g/L of neptunium fully decontaminated from fission products and able to be converted to a mixed oxide of uranium, plutonium and neptunium $(U,Pu,Np)O_2$.

CITED REFERENCES

[1] WO-A-2007/135178
[2] WO-A-2005/052950

The invention claimed is:

1. A process for reprocessing spent nuclear fuel which comprises:
a) decontaminating uranium and plutonium present in a first nitric acid aqueous phase, resulting from a dissolution of the nuclear fuel in nitric acid, from americium, curium and a major portion of fission products that are also present in the first nitric acid aqueous phase, which decontaminating comprises co-extracting the uranium in oxidation state VI and the plutonium in oxidation state IV in a first organic phase non-miscible with water and comprising a first extractant which is more capable of extracting uranium(VI) and plutonium(IV) than actinides(III) and fission products from the first nitric acid aqueous phase;
b) co-stripping, in a second nitric acid aqueous phase, the uranium and the plutonium co-extracted at a), the uranium being stripped in oxidation state VI and the plutonium being stripped in oxidation states IV and VI due to a formation, during the co-stripping, of plutonium(VI) by dismutation of plutonium(IV);
c) partitioning the uranium and the plutonium present in the second nitric acid aqueous phase from b) into a first aqueous solution comprising either plutonium without uranium or a mixture of uranium and plutonium, and a second aqueous solution comprising uranium without plutonium, which partitioning comprises:
selectively extracting all or part of the uranium(VI) present in the second nitric acid aqueous phase from b) in a second organic phase non-miscible with water and comprising a second extractant which is different from the first extractant and which is more capable of extracting uranium(VI) than plutonium(IV) from the second nitric acid aqueous phase, which extracting is performed after and/or jointly with a reduction of the plutonium(VI) present in the second nitric acid aqueous phase from b) to plutonium(IV); and
stripping, in a third nitric acid aqueous phase, the uranium(VI) thus extracted and thereby obtaining the second aqueous solution comprising uranium without plutonium; and
d) purifying the plutonium or the mixture of uranium and plutonium present in the second nitric acid aqueous phase from c) to remove any fission products which may still be present in the second nitric acid aqueous phase.

2. The process of claim 1, which further comprises:
a) decontaminating neptunium present in the first nitric acid aqueous phase from the americium, the curium and the major portion of the fission products that are also present in the first nitric acid aqueous phase, which decontaminating comprises co-extracting the uranium (VI), the plutonium(IV) and the neptunium, in oxidation state VI, in the first organic phase;
b) co-stripping, in the second nitric acid aqueous phase, the uranium, the plutonium and the neptunium co-extracted at a), the uranium being stripped in oxidation state VI, the plutonium being stripped in oxidation states IV and VI and the neptunium being stripped in oxidation states V and VI;
c) partitioning the uranium, the plutonium and the neptunium present in the second nitric acid aqueous phase stemming from b) into a first aqueous solution comprising a mixture of uranium, plutonium and neptunium, and a second aqueous solution comprising uranium without either plutonium or neptunium, which partitioning comprises:
selectively extracting a fraction of the uranium, in oxidation state VI, in the second organic phase, which extracting is performed after treating the second nitric acid aqueous phase from b) to reduce the plutonium (VI) present in the second nitric acid aqueous phase to plutonium(IV); and
stripping, in the third nitric acid aqueous phase, the fraction of uranium(VI) thus extracted and thereby obtaining the second aqueous solution comprising uranium without either plutonium or neptunium; and
d) purifying the mixture of uranium, plutonium and neptunium present in the second nitric acid aqueous phase from c) to remove any fission products which may still be present in the second nitric acid aqueous phase.

3. The process of claim 2, wherein d) comprises:
extracting the mixture of uranium, plutonium and neptunium present in the second nitric acid aqueous phase from c), in oxidation states VI, IV and VI respectively, in a third organic phase non-miscible with water and comprising a third extractant which is different from the second extractant and which is more capable of extracting the uranium(VI) and the plutonium(IV) than the fission products from the second nitric acid aqueous phase; and
stripping, in a fourth nitric acid aqueous phase, the mixture of uranium(VI), plutonium(IV) and neptunium(VI) thus extracted.

4. The process of claim 3, wherein the extraction of d) further comprises treating the second nitric acid aqueous phase from c) to displace the redox equilibrium existing between the oxidation states V and VI of the neptunium towards the formation of neptunium(VI).

5. The process of claim 1, which comprises:
a) decontaminating the uranium and plutonium present in the first nitric acid aqueous phase from neptunium, the americium, the curium and the major portion of the fission products that are also present in the first nitric acid aqueous phase, which decontaminating comprises co-extracting the uranium(VI) and the plutonium(IV) in the first organic phase, which co-extracting is performed after and/or jointly with treating of said first nitric acid aqueous phase to displace the redox equilibrium existing between the oxidation states V and VI of the neptunium towards the formation of neptunium(V);
b) co-stripping, in a second nitric acid aqueous phase, the uranium and the plutonium co-extracted at a), the uranium being stripped in oxidation VI and the plutonium being stripped in oxidation states IV and VI;
c) partitioning the uranium and the plutonium present in the second nitric acid aqueous phase from b) into a first aqueous solution comprising a mixture of uranium and plutonium, and a second aqueous solution comprising uranium without plutonium, which partitioning comprises:
selectively extracting a fraction of the uranium, in oxidation state VI, in the second organic phase, which extracting is performed after treating the second nitric acid aqueous phase from b) to reduce the plutonium(VI) present in the second nitric acid aqueous phase to plutonium(IV); and
stripping, in the third nitric acid aqueous phase, the fraction of uranium(VI) thus extracted and thereby obtaining the second aqueous solution comprising uranium without plutonium; and
d) purifying the mixture of uranium and plutonium present in the second nitric acid aqueous phase from c), to remove any fission products which may still be present in the second nitric acid aqueous phase.

6. The process of claim 5, wherein d) comprises:
extracting the mixture of uranium and plutonium present in the second nitric acid aqueous phase from c), in oxidation states VI and IV respectively, in a third organic phase non-miscible with water and comprising a third extractant which is different from the second extractant and which is more capable of extracting uranium(VI) and plutonium(IV) than fission products from the second nitric acid aqueous phase; and
stripping, in a fourth nitric acid aqueous phase, the mixture of uranium(VI) and plutonium(IV) thus extracted.

7. The process of claim 1, which comprises:
a) decontaminating the uranium and the plutonium present in the first nitric acid aqueous phase from neptunium, the americium, the curium and the major portion of the fission products also present in the first nitric acid aqueous phase, which decontaminating comprises co-extracting the uranium(VI) and plutonium(IV) in the first organic phase, which co-extracting is performed after and/or jointly with treating the first nitric acid aqueous phase to displace the redox equilibrium existing between the oxidation states V and VI of the neptunium towards the formation of neptunium(V);
b) co-stripping, in the second nitric acid aqueous phase, the uranium and the plutonium co-extracted at a), the uranium being stripped in oxidation VI and the plutonium being stripped in oxidation states IV and VI;
c) partitioning the uranium and the plutonium present in the second nitric acid aqueous phase from b) into a first aqueous solution comprising plutonium without uranium and a second aqueous phase comprising uranium without plutonium, which partitioning comprises:
selectively extracting all the uranium, in oxidation state VI, in the second organic phase, which extracting is performed after treating the second nitric acid aqueous phase from b) to reduce the plutonium(VI) present in the second nitric acid phase to plutonium (IV); and
stripping, in a third nitric acid aqueous phase, the uranium(VI) thus extracted and thereby obtaining the second aqueous solution comprising uranium without plutonium; and
d) purifying the plutonium present in the second nitric acid aqueous phase from c), to remove any fission products which may still be present in the second nitric acid phase.

8. The process of claim 7, wherein d) comprises:
extracting the plutonium present in the second nitric acid aqueous phase from step c), in oxidation state IV, in a third organic phase non-miscible with water and comprising a third extractant which is different from the second extractant and which is more capable of extracting plutonium(IV) than fission products from the second nitric acid aqueous phase; and
stripping, in a fourth nitric acid aqueous phase, the plutonium(IV) thus extracted.

9. The process of claim 1, which further comprises:
a) decontaminating neptunium present in the first nitric acid aqueous phase from the americium, the curium and the major portion of the fission products that are also present in the first nitric acid aqueous phase, which decontaminating comprises co-extracting the uranium (VI), plutonium(IV) and the neptunium, in oxidation state VI, in the first organic phase;
b) co-stripping, in a second nitric acid aqueous phase, the uranium, the plutonium and the neptunium co-extracted at a), the uranium being stripped in oxidation state VI, the plutonium being stripped in oxidation states IV and VI and the neptunium being stripped in oxidation states V and VI;
c) partitioning the uranium, the plutonium and the neptunium present in the second nitric acid aqueous phase from b) into a first aqueous solution comprising a mixture of plutonium and neptunium without uranium, and a second aqueous solution comprising uranium without either plutonium or neptunium, which partitioning comprises:

selectively extracting all the uranium, in oxidation state VI, in the second organic phase, which extracting is performed after treating the second nitric acid aqueous phase from b) to reduce the plutonium(VI) present in the second nitric acid aqueous phase to plutonium(IV); and stripping, in a third nitric acid aqueous phase, the uranium(VI) thus extracted and thereby obtaining the second aqueous solution comprising uranium without either plutonium or neptunium; and d) purifying the mixture of plutonium and neptunium present in the second nitric acid aqueous phase from c) to remove any fission products which may still be present in the second nitric acid aqueous phase.

10. The process of claim 9, wherein d) at least comprises:
extracting the mixture of plutonium and neptunium present in the second nitric acid aqueous phase from c), in oxidation states IV and VI respectively, in a third organic phase non-miscible with water and containing a third extractant which is different from the second extractant and which is more capable of extracting plutonium(IV) than fission products from the second nitric acid aqueous phase; and stripping, in a fourth nitric acid aqueous phase, the mixture of plutonium(IV) and neptunium(VI) thus extracted.

11. The process of claim 10, in which the extraction of d) further comprises treating the second nitric acid aqueous phase from c) to displace the redox equilibrium existing between the oxidation states V and VI of the neptunium towards the formation of neptunium(VI).

12. The process of claim 3, wherein the same extractant is used as first and third extractants.

13. The process of claim 12, wherein the first and third extractants are tri-n-butyl phosphate.

14. The process of claim 1, wherein the second extractant is a N,N-dialkylamide.

15. The process of claim 14, wherein the second extractant is N,N-di-(2-ethylhexyl)isobutanamide.

16. The process of claim 1, wherein c) further comprises adding nitrous acid to the second nitric acid aqueous phase from b).

17. The process of claim 4, wherein the treatment of the second nitric acid aqueous phase during the extraction of d) comprises adding nitrous acid.

18. The process of claim 1, which further comprises, between b) and c), concentrating the second nitric acid aqueous phase from b).

19. The process of claim 1, which further comprises, between c) and d), concentrating the second nitric acid aqueous phase from c).

20. The process of claim 1, wherein the spent nuclear fuel is an uranium oxide fuel or an uranium and plutonium mixed oxide fuel.

21. The process of claim 6, wherein the same extractant is used as first and third extractants.

22. The process of claim 21, wherein the first and third extractants are tri-n-butyl phosphate.

23. The process of claim 8, wherein the same extractant is used as first and third extractants.

24. The process of claim 23, wherein the first and third extractants are tri-n-butyl phosphate.

25. The process of claim 10, wherein the same extractant is used as first and third extractants.

26. The process of claim 25, wherein the first and third extractants are tri-n-butyl phosphate.

27. The process of claim 11, wherein the treatment of the second nitric acid aqueous phase during the extraction of d) comprises adding nitrous acid.

* * * * *